US011585690B2

(12) United States Patent
Bivolarsky et al.

(10) Patent No.: US 11,585,690 B2
(45) Date of Patent: Feb. 21, 2023

(54) MULTI-PATH ACOUSTIC SIGNAL IMPROVEMENT FOR MATERIAL DETECTION

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); James M. Heim, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/543,200

(22) Filed: Dec. 6, 2021

(65) Prior Publication Data

US 2022/0178731 A1 Jun. 9, 2022

Related U.S. Application Data

(60) Provisional application No. 63/121,727, filed on Dec. 4, 2020.

(51) Int. Cl.
*G01F 23/2965* (2022.01)
*G01N 29/024* (2006.01)
*G01F 23/296* (2022.01)

(52) U.S. Cl.
CPC ...... *G01F 23/2965* (2013.01); *G01F 23/2968* (2013.01); *G01N 29/024* (2013.01); *G01N 2291/02836* (2013.01)

(58) Field of Classification Search
CPC ............ G01F 23/2965; G01F 23/2968; G01N 29/024; G01N 2291/02836
See application file for complete search history.

(56) References Cited

U.S. PATENT DOCUMENTS

| 2,449,054 | A |   | 9/1948 | Chantlin | ............ 177/311 |
| 3,019,650 | A | * | 2/1962 | Worswick | ...... G01F 23/2961 |
| | | | | | 73/290 V |

(Continued)

FOREIGN PATENT DOCUMENTS

| CN | 105548370 | 5/2016 | ......... G01N 29/24 |
| DE | 10 2010 029 254 | 12/2011 | ............. F01N 3/10 |

(Continued)

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016); 14 pgs.

(Continued)

*Primary Examiner* — John Fitzgerald
(74) *Attorney, Agent, or Firm* — Hayes Soloway P.C.

(57) ABSTRACT

A multi-path acoustic signal apparatus, system, and apparatus for use in material detection are provided. The apparatus has a plurality of acoustic sensors positioned along a first portion of a fluid container. At least one acoustic signal is transmitted into the fluid container by each of the plurality of acoustic sensors. At least one additional acoustic sensor is positioned along a second portion of the fluid container, wherein the second portion is substantially opposite the first portion. The at least one additional acoustic sensor receives at least a portion of the acoustic signals from the plurality of acoustic sensors. A reflected acoustic signal is generated from an impedance barrier between the fluid container and a fluid therein. A characteristic of a material of the fluid container and/or the fluid therein are determined.

12 Claims, 5 Drawing Sheets

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A | 7/1976 | Green | H01L 41/08 |
| 4,065,958 A * | 1/1978 | Krylova | G01N 29/2462 73/64.53 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,280,126 A | 7/1981 | White | 340/621 |
| 4,320,659 A | 3/1982 | Lynnworth et al. | G01N 29/02 |
| 4,501,146 A | 2/1985 | Greenhalgh | G01F 23/28 |
| 4,580,448 A | 4/1986 | Skrgatic | G01F 23/28 |
| 4,596,266 A | 6/1986 | Kinghorn et al. | B65D 88/38 |
| 4,676,098 A | 6/1987 | Erlenkämper et al. | 73/290 |
| 4,852,416 A | 8/1989 | Boone et al. | H04R 1/02 |
| 4,934,191 A * | 6/1990 | Kroening | G01N 29/449 73/19.1 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,148,700 A | 9/1992 | King | G01N 15/00 |
| 5,195,058 A * | 3/1993 | Simon | G01F 23/2962 367/908 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,770,806 A | 6/1998 | Hiismaki | G01F 1/662 |
| 5,821,427 A | 10/1998 | Byrd | G01F 1/66 |
| 6,035,903 A | 3/2000 | Few et al. | B65B 1/04 |
| 6,151,956 A | 11/2000 | Takahashi et al. | G01N 3/56 |
| 6,157,894 A | 12/2000 | Hess et al. | 702/54 |
| 6,192,751 B1 * | 2/2001 | Stein | G01F 23/2962 73/61.79 |
| 6,330,831 B1 | 12/2001 | Lynnworth et al. | 73/861.28 |
| 6,368,281 B1 | 4/2002 | Solomon et al. | A61B 8/14 |
| 6,443,006 B1 | 9/2002 | Degrave | G02F 23/00 |
| 6,470,744 B1 | 10/2002 | Usui et al. | 73/290 |
| 6,481,287 B1 | 11/2002 | Ashworth et al. | G01K 11/24 |
| 6,513,385 B1 * | 2/2003 | Han | G01N 29/041 73/579 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01V 1/28 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamava | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,363,174 B2 | 4/2008 | Kishiro et al. | G01F 25/10 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,683,882 B2 | 4/2014 | Jackson | G01N 9/24 |
| 8,820,182 B2 | 9/2014 | Nikolay Nikolov et al. | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,557,208 B2 * | 1/2017 | Kuroda | G01F 23/2965 |
| 9,891,085 B2 | 2/2018 | Muhammad et al. | G01F 1/88 |
| 10,122,051 B2 | 11/2018 | Kuhne et al. | H01M 10/484 |
| 10,458,871 B2 * | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 2002/0170753 A1 | 11/2002 | Clare | G01G 19/22 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 | 9/2007 | Schenk, Jr. | G08B 21/00 |
| 2008/0092623 A1 | 4/2008 | Lynch et al. | G01N 29/02 |
| 2008/0101158 A1 | 5/2008 | Hosseini et al. | G01S 15/00 |
| 2009/0143681 A1 | 6/2009 | Jurvelin et al. | A61B 8/00 |
| 2010/0111133 A1 | 5/2010 | Yuhas et al. | G01K 17/00 |
| 2010/0199779 A1 | 8/2010 | Liu et al. | G01F 1/663 |
| 2010/0242593 A1 | 9/2010 | Lagergren et al. | G01F 23/296 |
| 2011/0029262 A1 | 2/2011 | Barkhouse | 702/55 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 * | 3/2012 | Sinha | G01F 25/10 73/61.79 |
| 2012/0259560 A1 | 10/2012 | Woltring et al. | 702/55 |
| 2012/0262472 A1 | 10/2012 | Garr et al. | G06T 11/206 |
| 2012/0281096 A1 | 11/2012 | Gellaboina et al. | G01S 15/89 |
| 2013/0002443 A1 | 1/2013 | Breed et al. | G08B 21/00 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0075278 A1 * | 3/2015 | Dockendorff | G01F 23/296 73/290 V |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/2962 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0146653 A1 | 5/2016 | Skelding | E21B 21/01 |
| 2016/0169839 A1 | 6/2016 | Gottlieb et al. | G01N 29/02 |
| 2016/0216141 A1 | 7/2016 | Leaders et al. | G01F 1/66 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/2962 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/406 |
| 2018/0080809 A1 | 3/2018 | Tokarev et al. | G01F 23/2965 |
| 2018/0149505 A1 | 5/2018 | Ploss et al. | G01F 1/66 |
| 2018/0266874 A1 | 9/2018 | Montoya et al. | G01F 23/68 |

(56) References Cited

U.S. PATENT DOCUMENTS

| | | | |
|---|---|---|---|
| 2018/0299317 A1 | 10/2018 | Truong et al. | G01F 23/2925 |
| 2018/0306628 A1* | 10/2018 | Parrott | G01N 29/223 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2962 |
| 2019/0078927 A1* | 3/2019 | Takayama | G01N 29/4463 |
| 2019/0137310 A1 | 5/2019 | Xiao et al. | G01F 1/06 |
| 2019/0195629 A1 | 6/2019 | Vaissiere | G01C 9/00 |
| 2019/0195830 A1 | 6/2019 | Tamura et al. | G01N 29/07 |
| 2019/0272496 A1 | 9/2019 | Moeller | G06Q 10/087 |
| 2020/0018628 A1 | 1/2020 | Head et al. | G21C 17/022 |
| 2020/0182736 A1 | 6/2020 | Kim et al. | G01M 3/2807 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0178879 A1* | 6/2022 | Bivolarsky | G01N 29/024 |
| 2022/0178881 A1* | 6/2022 | Bivolarsky | G01N 29/043 |

FOREIGN PATENT DOCUMENTS

| | | | |
|---|---|---|---|
| EP | 2450701 | 5/2012 | G01N 29/22 |
| EP | 2962096 | 8/2019 | G01L 1/255 |
| KR | 200174618 | 3/2000 | G01N 29/24 |
| WO | WO-8704793 A1 * | 8/1987 | |
| WO | WO 8809895 | 12/1988 | F16K 37/00 |
| WO | WO 2007/149605 | 12/2007 | |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018), 10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" Ultrasoncis vol. 62 (2015) pp. 223-236, Jun. 11, 2015, 14 pgs.

Amjad, Umar et al., "Detection and quantification of diameter reduction due to corrosion in reinforcing steel bars" Structural Health Monitoring 2015, vol. 14(5) 532-543, 12 pgs.

Amjad, Umar et al., "Detection and quantification of delamination in laminated plates from the phase of appropriate guided wave modes" Optical Engineering 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" Houston Chronicle, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" International Congress on Ultrasonics AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Examination Report No. 1 issued in Australian Application No. 2020283140 dated Jan. 4, 2022, 6 pgs.

Examination Report No. 1 issued in Australian Patent Application No. 2020302919, dated Feb. 15, 2022, 4 pgs.

International Search Report and Written Opinion issued in PCT/US20/35404, dated Aug. 24, 2020, 11 pages.

International Search Report and Written Opinion issued in PCT/US20/39966, dated Sep. 18, 2020, 13 pages.

International Preliminary Report on Patentability issued in PCT/US20/35404 dated Nov. 16, 2021, 8 pgs.

International Preliminary Report on Patentability issued in PCT/US20/39966 dated Dec. 28, 2021, 10 pgs.

Notice of Allowance issued in U.S. Appl. No. 16/888,469, dated Dec. 23, 2020, 16 pgs.

Notice of Allowance issued in U.S. Appl. No. 17/148,122 dated Jun. 16, 2021, 8 pgs.

Notice of Allowance issued in U.S. Appl. No. 16/914,092 dated Oct. 28, 2021, 14 pgs.

Office Action issued in Canadian Patent Application No. 3,140,008, dated Feb. 14, 2022, 4 pgs.

Office Action issued in U.S. Appl. No. 16/888,469, dated Aug. 5, 2020, 8 pages.

Office Action issued in U.S. Appl. No. 16/888,469, dated Sep. 8, 2020, 20 pages.

Office Action issued in U.S. Appl. No. 16/914,092, dated Nov. 10, 2020, 22 pgs.

Office Action issued in U.S. Appl. No. 16/914,092, dated Mar. 1, 2021, 25 pgs.

Office Action issued in U.S. Appl. No. 16/914,092, dated Jun. 24, 2021, 24 pgs.

Office Action issued in U.S. Appl. No. 17/148,122, dated Mar. 2, 2021, 26 pgs.

International Search Report and Written Opinion issued in PCT/US21/61962 dated Feb. 16, 2022, 9 pgs.

International Search Report and Written Opinion issued in PCT/US21/61924 dated Feb. 16, 2022, 9 pgs.

International Search Report and Written Opinion issued in PCT/US21/62010 dated Feb. 16, 2022, 9 pgs.

International Search Report and Written Opinion issued in PCT/US21/61970 dated Feb. 18, 2022, 17 pgs.

International Search Report and Written Opinion issued in PCT/US21/61925 dated Feb. 18, 2022, 9 pgs.

International Search Report and Written Opinion issued in PCT/US21/61646 dated Feb. 25, 2022, 9 pgs.

International Search Report and Written Opinion issued in PCT/US21/65664 dated Mar. 11, 2022, 9 pgs.

International Search Report and Written Opinion issued in PCT/US21/62001 dated March 9, 2022, 9 pgs.

International Search Report and Written Opinion issued in PCT/US21/61926 dated Mar. 8, 2022, 9 pgs.

Notice of Acceptance issued in Australian Application No. 2020302919 dated Mar. 2, 2022, 4 pgs.

Notice of Acceptance issued in Australian Application No. 2020283140 dated Mar. 30, 2022, 4 pgs.

Notice of Allowance issued in Canadian Application No. 3,140,008 dated May 5, 2022, 1 pg.

Office Action issued in Australian Patent Application No. 2020283140, dated Mar. 18, 2022, 5 pgs.

(56) References Cited

OTHER PUBLICATIONS

Office Action issued in U.S. Appl. No. 17/542,461, dated Mar. 10, 2022, 18 pages.
Office Action issued in U.S. Appl. No. 17/542,465, dated Mar. 11, 2022, 22 pages.
Office Action issued in U.S. Appl. No. 17/542,872, dated Mar. 17, 2022, 21 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Vermeersch, "Influence of substrate thickness on thermal impedance of microelectronics structures", Microelectronics Reliability, 47, 2007, pp. 437-443.
U.S. Appl. No. 17/540,021, filed Dec. 1, 2021, Heim et al.
U.S. Appl. No. 17/541,036, filed Dec. 2, 2021, Heim et al.
U.S. Appl. No. 17/543,152, filed Dec. 6, 2021, Bivolarsky et al.
U.S. Appl. No. 17/542,814, filed Dec. 6, 2021, Burcham et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 17/746,622, filed May 17, 2022, Bivolarsky et al.
U.S. Appl. No. 17/746,640, filed May 17, 2022, Bivolarsky et al.
Office Action issued in U.S. Appl. No. 17/542,462, dated May 27, 2022, 28 pages.
Office Action issued in U.S. Appl. No. 17/542,461, dated June 27, 2022, 13 pages.
Office Action issued in U.S. Appl. No. 17/566,020, dated Jul. 12, 2022, 20 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/542,462, dated Nov. 14, 2022, 11 pgs.
Office Action issued in U.S. Appl. No. 17/566,020, dated Nov. 14, 2022, 21 pgs.
Notice of Allowance issued in U.S. Appl. No. 17/542,461, dated Oct. 12, 2022, 9 pages.
Notice of Allowance issued in U.S. Appl. No. 17/746,622, dated Nov. 8, 2022, 16 pages.

* cited by examiner

MULTI-PATH ACOUSTIC SIGNAL IMPROVEMENT FOR MATERIAL DETECTION

CROSS REFERENCE TO RELATED APPLICATION

This application claims benefit of U.S. Provisional Application Ser. No. 63/121,727 filed Dec. 4, 2020 and titled "Multi-Path Acoustic Signal Improvement for Material Detection", the entire disclosure of which is incorporated herein by reference.

FIELD OF THE DISCLOSURE

The present disclosure is generally related to acoustic signals and more particularly is related to multi-path acoustic signal improvements for material detection.

BACKGROUND OF THE DISCLOSURE

Many materials that are transported through pipes have significant acoustic impedance difference with material that the pipe sidewall is formed from. For example, fluids, liquids, and other viscous materials have a significant acoustic impedance difference relative to pipes or pipelines formed from metals, such as cast iron, steel, aluminum, or the like. Similarly, materials stored in containers, especially metal containers such as oil and gas storage tanks, have characteristically big differences with the material that the container wall is formed from.

With regards to the oil and gas industry specifically, steel is the material often used for pipelines. A steel pipe carrying crude oil has an acoustic impedance barrier which reflects approximately 88% of the energy of the acoustic wave back into the pipe wall depending on the temperature. Only approximately 12% from the energy of the incident wave is transmitted into the crude oil itself. In a similar example, when a cast iron pipe is used to transport water, the amount of the reflected energy is approximately 98.30311% from the incidence wave energy. Due to this reflection of the acoustic wave energy, pipelines and containers with larger sizes often present a challenge for nondestructive analysis since most of the initial signal is lost just crossing the sidewall of the pipe or container containing the fluid.

Thus, a heretofore unaddressed need exists in the industry to address the aforementioned deficiencies and inadequacies.

SUMMARY OF THE DISCLOSURE

Embodiments of the present disclosure provide a multi-path acoustic signal system, apparatus, and related methods for use in material detection. Briefly described, in architecture, one embodiment of the apparatus, among others, can be implemented as follows. The apparatus has a plurality of acoustic sensors (or transceivers) positioned along a first portion of a fluid container. At least one acoustic signal is transmitted into the fluid container by each of the plurality of acoustic sensors. At least one additional acoustic sensor is positioned along a second portion of the fluid container, wherein the second portion is substantially opposite the first portion. The at least one additional acoustic sensor receives at least a portion of the acoustic signals from the plurality of acoustic sensors. A reflected acoustic signal is generated from an impedance barrier between the fluid container and a fluid therein. A characteristic of a material of the fluid container and/or the fluid therein are determined.

The present disclosure can also be viewed as providing methods of detecting a material within a fluid container. In this regard, one embodiment of such a method, among others, can be broadly summarized by the following steps: transmitting at least one acoustic signal from each of a plurality of acoustic sensors positioned along a first portion of the fluid container; receiving, with at least one additional acoustic sensor positioned along a second portion of the fluid container, the at least one transmitted acoustic signal, wherein the second portion is substantially opposite the first portion of the fluid container; and determining, based on the at least one received acoustic signal, a composition of the material within the fluid container.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve upon the use of acoustic signals for the detection of materials in fluid-holding pipes, pipelines, containers, or other structures, a multi-path acoustic signal apparatus 10 is provided. In particular, it has been discovered that using a sheer wave through the sidewall of a container holding a material will increase the amount of acoustic energy that is transmitted into the material within the container. In one example, the increase of acoustic energy exceeded 21%. However, the acoustic shear waves are generated with smaller initial energy. Accordingly, to increase the energy of the initial signal, and therefore the effective signal received at a receiving acoustic sensor which is positioned across the container, it is possible to use multiple signals from multiple acoustic sensors that are directed towards the same location on the other side of the container.

Figure 1:
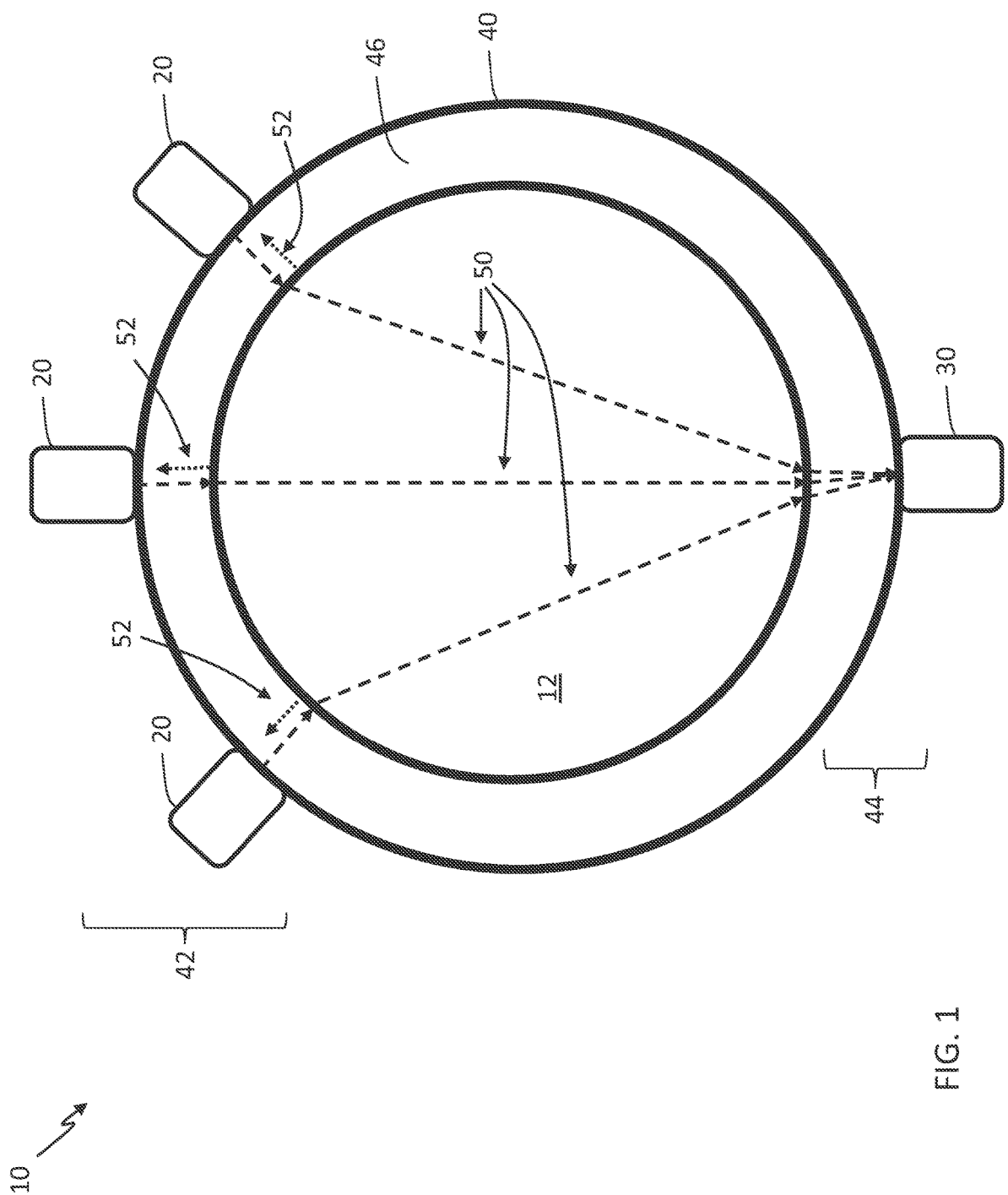
FIG. 1 is a diagrammatical illustration of a multi-path acoustic signal apparatus, in accordance with a first exemplary embodiment of the present disclosure.

FIG. 1 is a diagrammatical illustration of the multi-path acoustic signal apparatus 10, in accordance with a first exemplary embodiment of the present disclosure. The multi-path acoustic signal apparatus 10, which may be referred to simply as 'apparatus 10' includes a plurality of acoustic sensors 20 positioned along a first portion 42 of a fluid container 40, such as a pipeline, as shown in FIG. 1. Any plural number of the acoustic sensors 20 or transducers may be used, and the acoustic sensors 20 may be positioned along a single side or location of the container 40. For instance, in FIG. 1, the acoustic sensors 20 are positioned along a first portion 42 of the container 40, which generally includes a finite area of radial curvature of the container 40, or a portion encompassing less than the entire circumference or perimeter of the fluid container 40. In one example, the first portion 42 may extend to no more than half of the circumference or perimeter of the fluid container 40. For containers 40 that have planar or substantially planar sidewalls, the acoustic sensors 20 may be positioned on a single sidewall or a portion thereof.

At least one acoustic signal 50 is transmitted by each of the acoustic sensors 20 into the fluid container 40, and into a material 12 within the container 40. To aid in clarity of disclosure, the apparatus 10 is described herein relative to a container 40 that is a pipe or pipeline which carries a fluid oil or gas product, but the apparatus 10 can be used in other fields with other containers, such as those holding or transporting water, chemicals, or other materials. The acoustic signal 50 that is transmitted travels through the sidewall 46 of the container 40, through the interior of the container 40 and through any material 12 therein, and through the sidewall 46 of the container 40 on a substantially opposite side of the container 40 from the locations of the acoustic sensors 20. When the signal 50 passes through the sidewall 46 for the second time, it is received within at least one additional acoustic sensor 30, which is positioned along a second portion 44 of the fluid container 40.

As shown in FIG. 1, the second portion 44 of the container 40 may be substantially opposite the first portion 42, such that as the signal 50 is transmitted between the sensors 20, 30, it travels through the interior of the container 40. In one example, the second portion 44 may include any portion of or position along the circumference of the fluid container 40. In another example, the second portion 44 may be less than the entire circumference of the fluid container 40. In another example, the second portion 44 may be the portion of the circumference that is not the first portion 42. In another example, at least a portion of the first and second portions 42, 44 may overlap. The sensors 20, 30 are located on the exterior surface of the container 40 and may be positioned in a location to account for the transmission angle of the signal 50 from the acoustic sensor 20 and changes in crossing the impedance barrier between the material forming the container 40 and the material 12 within the container. In one example, the sensors 20, 30 may be in direct contact with the container 40. In another example, a couplant material may be used between the sensors 20, 30 and the container 40 to ensure proper transfer of the acoustic signals 50. During the installation of the apparatus 10, locations of each acoustic sensor 20, 30 may be determined depending on the geometry of the container, e.g., cylindrical pipe, cylindrical tank, cuboid tank, etc., the material which is used to form the sidewall 46 of the container 40, and the material 12 or materials inside the container 40. In one example, the acoustic sensors 20 may be positioned at equal distances, one from another, such that the adjacent sensors 20 are spaced apart evenly. In another example, the acoustic sensors 20 may be separated and spaced apart from each other at different distances, one from another. In another example, the acoustic sensors 20 may be positioned at desired angular positions, for instance, at 0°, 15°, 30°, 45°, 60°, or any desired angle. In another example, the acoustic sensors 20 may be separated according to desired angular increments, such as increments of 5°, 10°, 15°, and so on. The angular placement of the acoustic sensors 20 may be determined relative to an orientation of the at least one additional acoustic sensor 30 or to an axis extending through a cross-section of the fluid container 40.

In one example, at least one acoustic sensor 20 may be directly opposite the at least one additional acoustic sensor 30. In other words, at least one acoustic sensor 20 may be positioned directly opposite the additional acoustic sensor 30 relative to the fluid container 40. An acoustic signal 50 transmitted from the acoustic sensor 20 may propagate through an entire diameter or internal length of the fluid container 40, depending on the geometry. The acoustic signal 50 may propagate through a center or central area of the interior of the fluid container 40. Other acoustics sensors 20 may be positioned so that the acoustic signals 50 transmitted from those sensors 20 may have traveled shorter distances than the entire diameter or internal length of the fluid container 40 to reach the additional acoustic sensor 30.

In one example, the plurality of acoustic sensors 20 and the at least one additional acoustic sensor 30 may be positioned so that the transmitted acoustic signals 50 travel through a distance of at least half of a diameter of the fluid container 12. For instance, one acoustic sensor 20 may be positioned at an angle of 0° relative to the additional acoustic sensor 30. Subsequent acoustic sensors 20 may be positioned at larger angles relative to the additional acoustic sensor 30, but not closer than half the circumference or interior length of the fluid container 12.

At least one additional acoustic sensor 30 receives at least a portion of the acoustic signals 50 from the acoustic sensors 20 transmitting the signals 50. Due to the impedance barrier between the materials of the container 40 and the material 12 therein, a reflected acoustic signal is generated. This reflected acoustic signal may be received at the acoustic sensors 20 or it may dissipate, thereby leaving the portion of the original acoustic signal 50. From the acoustic signal 50 received at the acoustic sensor 30, and/or the reflected signals, and commonly a combination thereof, it is possible to analyze the signals to identify a characteristic of the material forming a sidewall 46 of the fluid container 40 and/or the fluid 12 or other material within the container 40.

Figure 2:
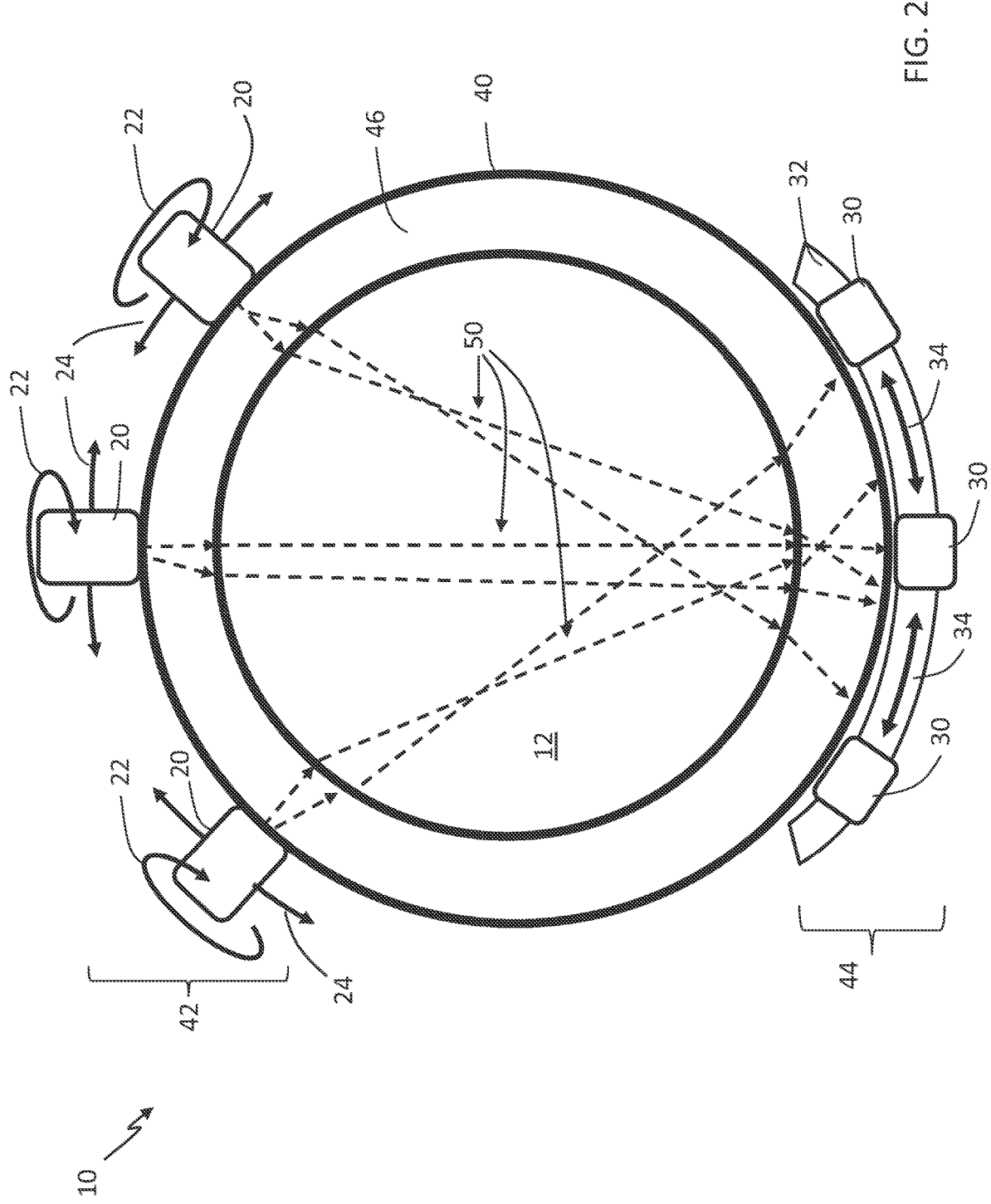
FIG. 2 is a diagrammatical illustration of a variation of the multi-path acoustic signal apparatus of FIG. 1, in accordance with the first exemplary embodiment of the present disclosure.

FIG. 2 is a diagrammatical illustration of a variation of the multi-path acoustic signal apparatus 10 of FIG. 1, in accordance with the first exemplary embodiment of the present disclosure. It is noted that the receiving sensor 30 can be configured as a single sensor 30, as depicted in FIG. 1, or as multiple acoustic sensors 30, as depicted in FIG. 2, which illustrates a variation of the multi-path acoustic signal apparatus of FIG. 1. Additionally, as shown in FIG. 2, the acoustic sensors 30 may be configured as a sensor array which are mounted together on an array structure 32, and/or they may be movable in position, as indicated by arrows 34. An array of acoustic sensors 30 may increase the accuracy of the measurement of the incidence angles, which may in turn increase the accuracy of measured impedance. This may allow direct measurement of material density as an independent parameter using only the measured time of flight and the angle of transmission of shear wave signals after crossing one or more impedance barriers.

The movable acoustic sensor 30 which receives the signal 50 can be moved in a variety of directions and positions. For example, it can be moved along a plane tangential to the cylindrical shape and sidewall of the container 40. For containers 40 which have other shapes, such as cuboid, the acoustic sensor 30 may only need to be moved in a planar direction on one side of the container 40. This movement of the acoustic sensor 40 can catch signals 50 that reflect geometrically outside of the baseline acoustic sensor 30 location, e.g., as depicted in FIG. 1. This may be especially important for situations where there is a change of temperature or change of fluid composition of the material 12 inside the container 40. In one example, at least one of the acoustic sensors 30 may remain stationary. For instance, a central acoustic sensor 30 may remain in a fixed position, while other acoustic sensors 30 move about the fluid container 40. In another example, one or more acoustic sensors 30 may remain stationary at a first measurement time, but may move at or in order to acquire a subsequent measurement. It should be understood that any combination of stationary, moveable, and periodically moving sensors 30 is within the scope of the subject disclosure.

In one example, moving the acoustic sensor 30 may allow for the measurement and tracking of fluid material density changes or temperature changes, or any other material property changes within the volume of the material.

It may be possible to use a laser interferometer design in operation with the movable acoustic sensor 30, which may include an acoustic peak detector, similar to that used in radio signal transmission, where electromagnetic wave receivers change frequencies to find signals peak due to fading, which may be due to the fact that the carrier frequency may be modified but the frequency encoding is the same.

It is noted that the number of acoustic sensors 20 on the signal 50 transmission side can be determined from various factors, including the condition of the fluid material 12 inside the container 40, a movement or flow of the material 12 within the container, and/or a need for increased signal strength. It is also noted that the acoustic sensors 20 which transmit the signal 50 may be capable of moving position and/or rotating, as indicated by arrows 22, 24 in FIG. 2. For example, the acoustic sensors 20 may be capable of rotating or moving in a plane tangential to the surface of the container 40. This ability of the transmitting acoustic sensors 20 to change position or rotate allows for the signal transmission to compensate for any changing conditions in the material 12, and to control or steer the desired path of the signal 50.

The type of acoustic signal 50 transmitted from the acoustic sensors 20 through the sidewall 46 of the container 40 may include shear waves and/or longitudinal waves, since the incidence angles can be set to match the conditions of the apparatus 10, the container 40, and/or the material 12 therein. The frequency of the acoustic signal 50 may be any suitable acoustic frequency or combination of frequencies within the acoustic spectrum, including subsonic, sonic, and ultrasonic frequencies. The frequencies used may be determined based on the composition of the fluid container 40, the expected fluid material 12, or a combination thereof.

The acoustic sensors 30 sensing the material composition of the sidewall 46 of the container 40 may receive the first echo 52 when processing the signal from the acoustic sensors 20 transmitting the signal 50, as shown in FIG. 1. Then, the remaining signal 50 penetrates the inner surface of the sidewall 46 of the container. At this point, the reflections from this impedance barrier can be processed to determine the type of material 12 within the container 40. The use of additional acoustic sensors 20 which transmit additional signals 50 in additional pathways act to increase the signal fidelity and improve the accuracy of the apparatus 10.

Figure 3:
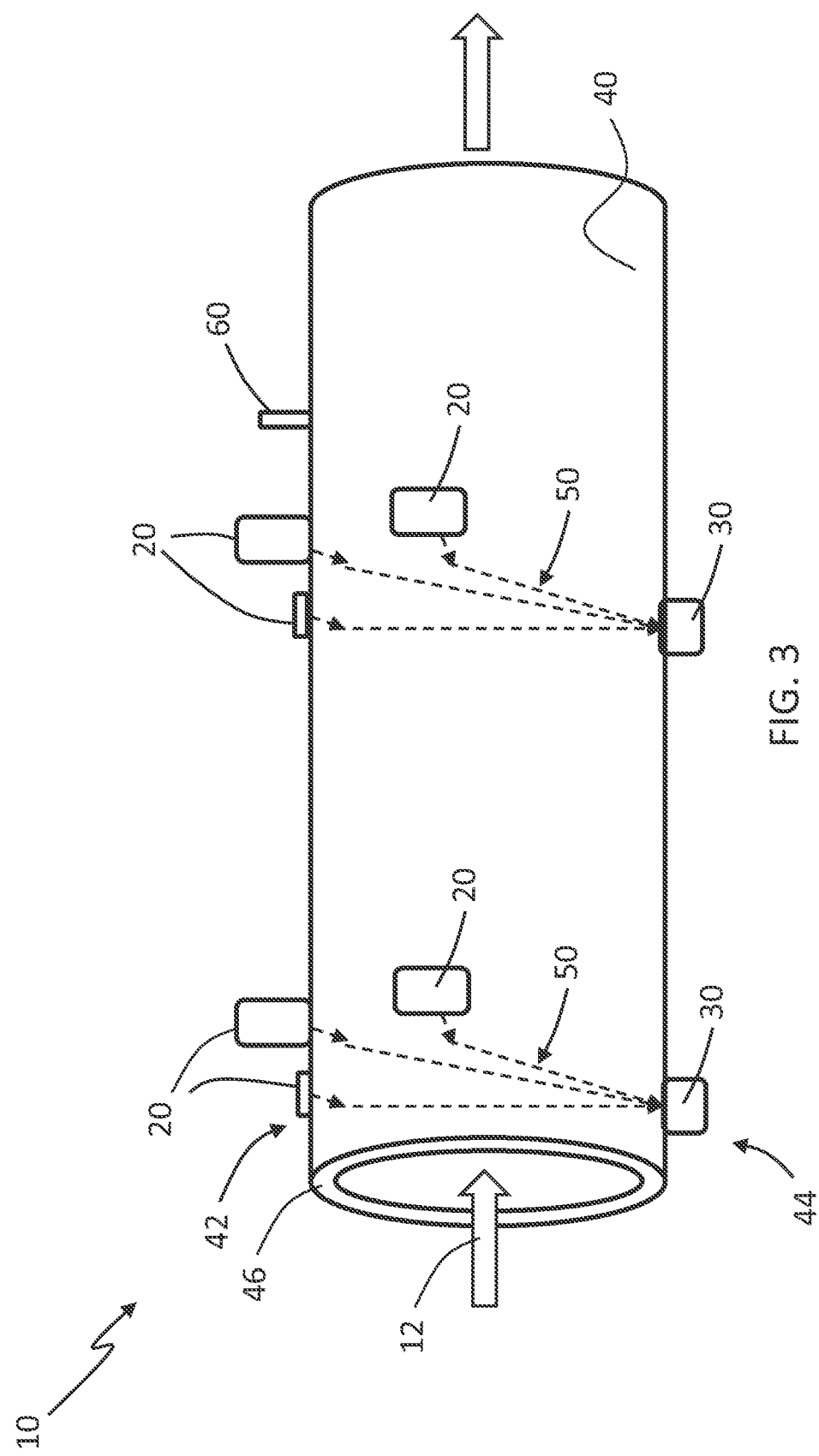
FIG. 3 is a side-view, diagrammatical illustration of a variation of the multi-path acoustic signal apparatus of FIG. 1, in accordance with the first exemplary embodiment of the present disclosure.

Turning to FIG. 3, it is a side-view, diagrammatical illustration of a variation of the multi-path acoustic signal apparatus 10 of FIG. 1, in accordance with the first exemplary embodiment of the present disclosure. In particular, FIG. 3 illustrates the apparatus in use with a fluid material 12 which flows or moves through a container 40, such as a pipeline. When the fluid material 12 is flowing through the container 40, the acoustic sensors 20, 30 sensing the signals 50 can be added in two or more dimensions or positions along the direction of the flow of the fluid material 12, e.g., in a perpendicular direction of the flow of the fluid material 12. This allows the apparatus to determine the flow of the fluid material 12 and additional parameters of the fluid material 12, such as the type of material, the density of the material, or other characteristics. As shown in FIG. 3, one group of acoustic sensors 20, 30 is positioned near one side of the container 40 while a second group of sensors 20, 30 are positioned towards a different side of the container 40. Each group includes sending sensors 20 and the acoustic sensor 30 or sensors which receive the signal 50.

With respect to the apparatus 10 in FIGS. 1-3, the signals 50 transmitted may be phase synchronized since it may be necessary to combine their amplitudes in the receiving sensor 30 before processing of the signal 50. It is possible to use the wave physical properties to amplify the signal 50, such as by superimposing multiple waves 50 over time. While adding multiple signals 50 that measure the same parameters, the noise from the multiple signals 50 stays the same as for single transducer 20 due to the random characteristic of the noise. Attenuation is most affected by this process since this parameter is most sensitive to the material parameters. Additionally, acoustic wave absorption as well as speed of sound may be compensated for temperature, and as such, a temperature sensor 60 may be used to identify the temperature of the fluid material 12. The temperature sensor 60 may be in communication with the fluid material 12 either directly, or in indirect thermal communication in order to determine the temperature of the fluid material 12. In one example, the temperature sensor 60 may determine the temperature of the fluid container 40.

Furthermore, the wave absorption may be measured at different frequencies. Different frequencies can be used in certain cases, where the material acoustic attenuation allows for receiving of different signals 50 with each individual signal 50 using a separate frequency or range of frequencies. In this way, the signals 50 may not need to be synchronized and it may be possible to measure multiple points of the absorption vs. frequency curve at the same time periodically.

Additionally, it is noted that time of flight measurements may be taken, and additional processing may be used since each path of the signal 50 may have a different time of flight. In the case when each signal path is using different frequencies, the time of flight may be measured separately.

In operation, the apparatus 10 may be calibrated during assembly or before use. In one example, calibration may include mounting an acoustic sensor 20 to the exterior of the fluid container 40 along the first portion 42. The at least one additional acoustic sensor 30 may be mounted along the second portion 44. The additional acoustic sensor 30 may be moved about the fluid container 40 until a maximum signal point is found, which may be used to determine a first path of the signal between the acoustic sensors 20, 30. More acoustic sensors 20 may be mounted to the outside of the fluid container 40 at different locations along the first portion 42. The acoustic sensors 20 may be moved until a maximum signal point between the sensors 20 and the additional acoustic sensor 30 is found. This may allow the apparatus 10 to better operate within larger fluid containers 40.

Figure 4:
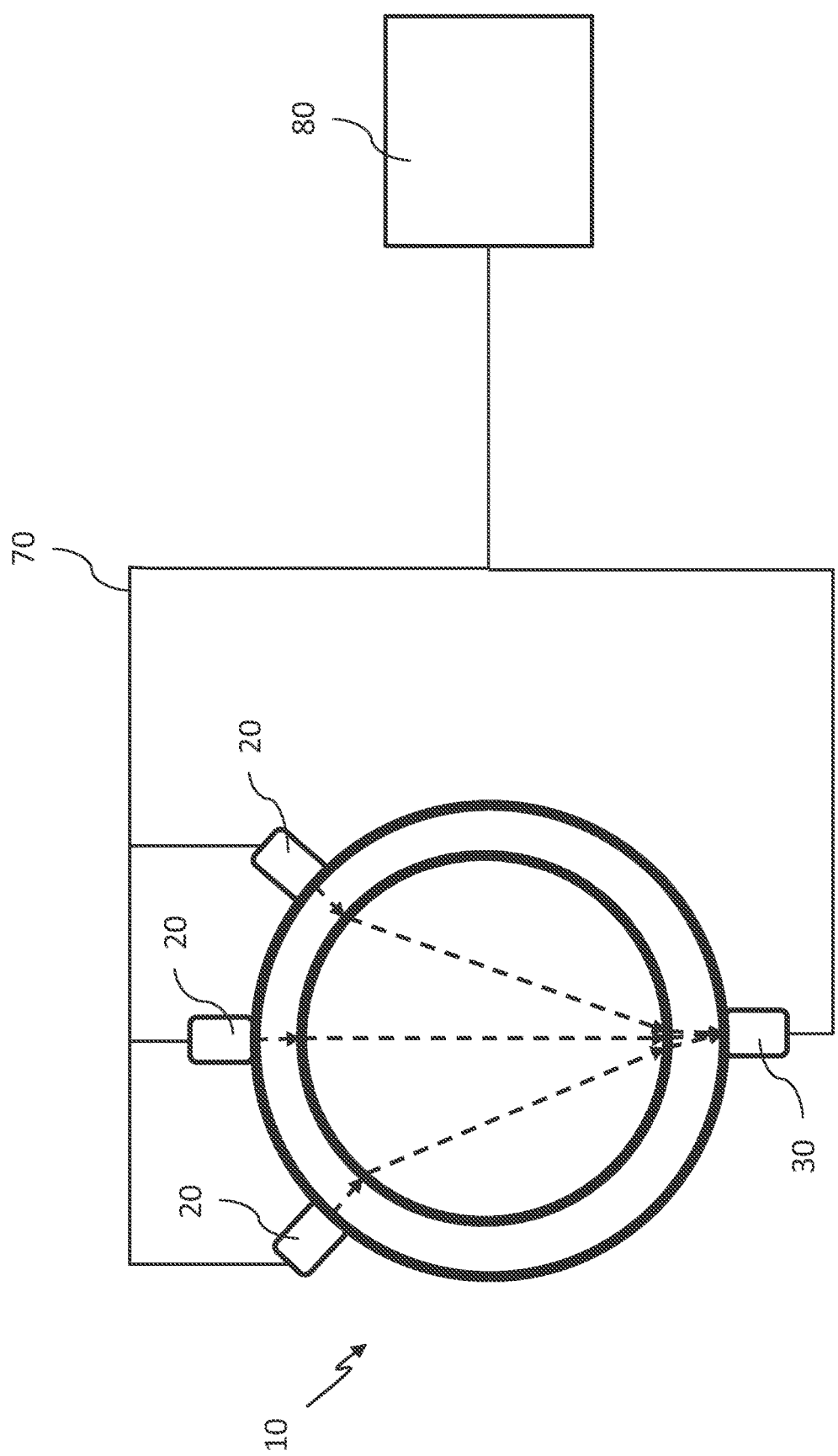
FIG. 4 is a diagrammatical illustration of the multi-path acoustic signal apparatus of FIG. 1 in communication with a computer processor, in accordance with the first exemplary embodiment of the present disclosure.

FIG. 4 is a diagrammatical illustration of the multi-path acoustic signal apparatus 10 of FIG. 1 in communication with a computer processor 80, in accordance with the first exemplary embodiment of the present disclosure. The apparatus 10 may be understood with reference to FIGS. 1-3, above; however, for clarity of illustration, not all of the reference characters have been shown. The acoustic sensors 20, 30 may be in electrical communication over at least one network 70 with a computer processor 80. The at least one network 70 may include any suitable network systems, including wired data connections and wireless data connections, e.g., LAN, intranet, Internet, Wi-Fi®, Bluetooth®, NFC, radio, or any other type of network connection. The computer processor 80 may include any type and number of processors, including stationary processors, mobile processors, mobile devices, processor arrays, cloud processing networks, and the like. The computer processor 80 may include any components required for operation, including a power source, computer-readable memory, network communications, and the like.

Data from the acoustic sensors 20, 30 may be communicated to the computer processor 80 along the at least one network 70. Communicated data may include data from the plurality of acoustic sensors 20 positioned along the first portion 42 of the fluid container 40, such as characteristic information about any acoustic signals transmitted, and received data from any reflected acoustic signals received by the acoustic sensors 20. Communicated data may further include data from the at least one additional acoustic sensor 30 positioned along the second portion 44 of the fluid container 40, such as received data from the transmitted acoustic signals 50 received by the additional acoustic sensor 30. The communicated data may be analyzed to determine composition and other material characteristics of the material 12 within the fluid container 40.

Figure 5:
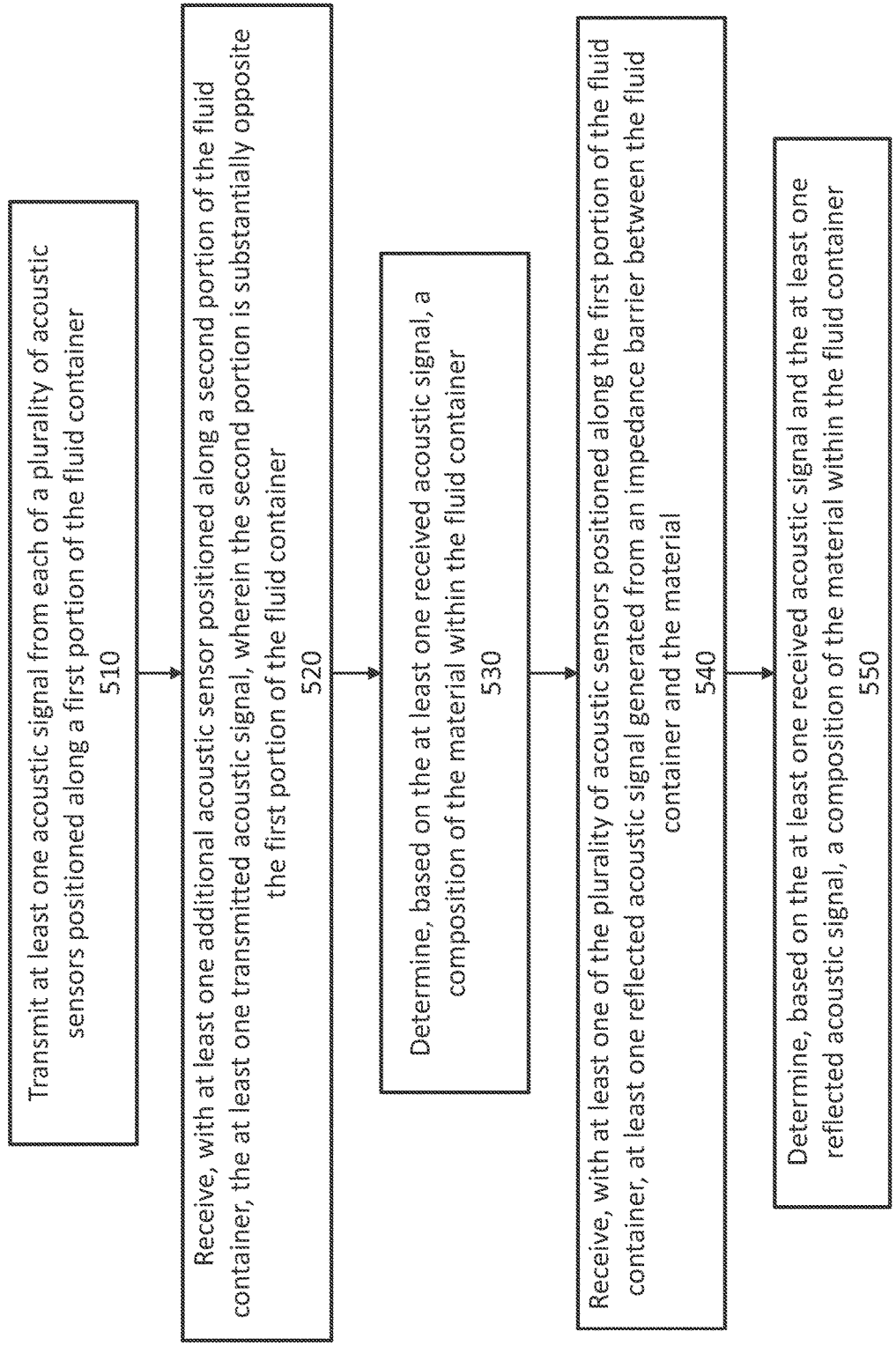
FIG. 5 is a flow chart illustrating a method of detecting a material within a fluid container, in accordance with the first exemplary embodiment of the present disclosure.

FIG. 5 is a flow chart 500 illustrating a method of detecting a material within a fluid container, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 510 includes transmitting at least one acoustic signal from each of a plurality of acoustic sensors positioned along a first portion of the fluid container. In one example, at least one of the transmitted acoustic signals may differ from another transmitted acoustic signal in one or more ways. For instance, at least one transmitted acoustic signal may have a frequency different from another. At least one transmitted acoustic signal may have a pulse length or transmission length different from another. For example, one signal may include a shorter pulse, while another may include a long pulse. In one example, one transmitted acoustic signal may be continuous, while another is not. At least one transmitted acoustic signal may have a periodic or patterned transmission. In another example, one or more transmitted acoustic signals may have the same frequency, pulse length, or periodic or patterned transmission.

In one example, at least one of the transmitted acoustic signals may propagate through the fluid container in a direction different from another acoustic signal. For instance, the plurality of acoustic sensors may be positioned at different angular locations on the fluid container, but may each be oriented toward the same point. Put another way, all of the acoustic sensors may be located at different positions within a plane extending through the fluid container.

In one example, a phase of the transmitted acoustic signals may be synchronized between the signals such that periodic maxima and minima in the amplitude of the signals occur at the same time. This may allow the transmitted signals to be constructively or destructively interfered with one another.

Step 520 includes receiving, with at least one additional acoustic sensor positioned along a second portion of the fluid container, the at least one transmitted acoustic signal, wherein the second portion is substantially opposite the first portion of the fluid container. In one example, at least one of the transmitted acoustic signals may travel through the entire diameter of the fluid container. In another example, at least one of the transmitted acoustic signals may travel through less than the entire diameter of the fluid container.

Step 530 includes determining, based on the at least one received acoustic signal, a composition of the material within the fluid container.

Step 540 includes receiving, with at least one of the plurality of acoustic sensors positioned along the first portion of the fluid container, at least one reflected acoustic signal generated from an impedance barrier between the fluid container and the material.

Step 550 includes determining, based on the at least one received acoustic signal and the at least one reflected acoustic signal, a composition of the material within the fluid container. In one example, a temperature sensor may be used to determine a temperature of the material, the fluid container, or both. The determined temperature or temperatures may be used to determine the composition or other characteristics of the material within the fluid container.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claim.

What is claimed is:

1. A multi-path acoustic signal apparatus for use in material detection, the apparatus comprising:
a plurality of acoustic transceivers positioned along a first portion of a fluid container;
at least one acoustic signal transmitted into the fluid container by each of the plurality of acoustic transceivers;
at least one additional acoustic transceiver positioned along a second portion of the fluid container, wherein the second portion is substantially opposite the first portion, and wherein the at least one additional acoustic transceiver receives at least a portion of the acoustic signals from the plurality of acoustic transceivers; and a reflected acoustic signal generated from an impedance barrier between the fluid container and a fluid therein, and wherein a characteristic of a physical material of the fluid container and/or the fluid therein is determinable based on, at least in part, the reflected acoustic signal generated form the impedance barrier.

2. The multi-path acoustic signal apparatus of claim 1, wherein at least one of the plurality of acoustic transceivers is positioned directly opposite the at least one additional acoustic transceiver.

3. The multi-path acoustic signal apparatus of claim 1, wherein the plurality of acoustic sensors are evenly spaced apart from one another.

4. The multi-path acoustic signal apparatus of claim 1, wherein the plurality of acoustic transceivers are spaced apart from one another at different distances.

5. The multi-path acoustic signal apparatus of claim 1, wherein at least one of the plurality of acoustic transceivers is rotatable within a plane tangential to a surface of the fluid container.

6. The multi-path acoustic signal apparatus of claim 1, wherein the plurality of acoustic transceivers and the at least one additional acoustic transceiver are positioned so that the transmitted acoustic signals travel through a distance of at least half a diameter of the fluid container.

7. The multi-path acoustic signal apparatus of claim 1, wherein at least one transmitted acoustic signal travels through a distance of an entire diameter of the fluid container.

8. The multi-path acoustic signal apparatus of claim 1, wherein the first portion extends no more than half of a perimeter of the fluid container.

9. The multi-path acoustic signal apparatus of claim 1, wherein the at least one additional acoustic transceiver is movable along a plane tangential to a sidewall of the fluid container.

10. The multi-path acoustic signal apparatus of claim 1, further comprising a temperature sensor in communication with the material.

11. The multi-path acoustic signal apparatus of claim 1, wherein the at least one additional acoustic transceiver comprises an array of acoustic transceivers.

12. The multi-path acoustic signal apparatus of claim 11, wherein the acoustic transceivers in the array are movable about an exterior sidewall of the fluid container.

* * * * *